United States Patent
Lyu et al.

(10) Patent No.: US 12,425,273 B2
(45) Date of Patent: Sep. 23, 2025

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/951,163

(22) Filed: Nov. 18, 2024

(65) Prior Publication Data

US 2025/0080383 A1      Mar. 6, 2025

Related U.S. Application Data

(63) Continuation of application No. PCT/CN2023/082088, filed on Mar. 17, 2023.

(30) Foreign Application Priority Data

Mar. 10, 2023   (CN) .......................... 202310224812.3

(51) Int. Cl.
    *H04L 25/02*    (2006.01)
(52) U.S. Cl.
    CPC ................ *H04L 25/0224* (2013.01)
(58) Field of Classification Search
    None
    See application file for complete search history.

(56) References Cited

U.S. PATENT DOCUMENTS

2021/0083911 A1* 3/2021 Morozov ............ H04L 27/2636
2021/0226833 A1* 7/2021 Park .................. H04W 72/0453
(Continued)

FOREIGN PATENT DOCUMENTS

CN        109219130 A     1/2019
CN        114629758 A     6/2022
(Continued)

OTHER PUBLICATIONS

3GPP TS 38.101-1 V15.16.0, "3rd Generation Partnership Project; Technical Specification Group Radio Access Network; NR; User Equipment (UE) radio transmission and reception; Part 1: Range 1 Standalone (Release 15)," Dec. 2021, 199 pages.
(Continued)

*Primary Examiner* — Hassan A Phillips
*Assistant Examiner* — Gautam Sharma
(74) *Attorney, Agent, or Firm* — Fish & Richardson P.C.

(57) ABSTRACT

A method and an apparatus for wireless communication are provided. One example method includes: determining, by a terminal device operating in a non-terrestrial network (NTN) system, a plurality of frequency compensation segments within a first time period based on first information, wherein the first information comprises information of demodulation reference signal (DMRS) bundle used for joint channel estimation, and the first time period comprises at least one time domain window corresponding to the DMRS bundle; and performing, by the terminal device, pre-compensation on an uplink channel corresponding to the first time period based on the plurality of frequency compensation segments.

20 Claims, 4 Drawing Sheets

(56) References Cited

U.S. PATENT DOCUMENTS

| | | | |
|---|---|---|---|
| 2022/0046566 A1 | 2/2022 | Leng et al. | |
| 2022/0225363 A1* | 7/2022 | Shim | H04L 1/08 |
| 2022/0376743 A1* | 11/2022 | Chen | H04L 27/0014 |
| 2022/0399971 A1* | 12/2022 | Sridharan | H04W 72/23 |
| 2023/0098154 A1* | 3/2023 | Taherzadeh Boroujeni | H04L 5/0094 370/329 |
| 2023/0119776 A1* | 4/2023 | Ma | H04L 5/0051 370/329 |
| 2023/0132509 A1* | 5/2023 | Kumar | H04L 27/26132 370/329 |
| 2024/0031963 A1* | 1/2024 | Sayed Hassan | H04B 17/318 |
| 2024/0080224 A1* | 3/2024 | Sun | H04B 7/18513 |
| 2024/0137111 A1* | 4/2024 | Zhang | H04B 7/18532 |
| 2024/0155577 A1* | 5/2024 | Li | H04L 27/2613 |
| 2024/0284448 A1* | 8/2024 | Ahmadzadeh | H04W 72/0453 |
| 2024/0297761 A1* | 9/2024 | Ma | H04L 5/0051 |
| 2024/0388338 A1* | 11/2024 | Cao | H04B 7/06 |
| 2024/0388390 A1 | 11/2024 | Harrison et al. | |

FOREIGN PATENT DOCUMENTS

| | | |
|---|---|---|
| CN | 114793189 A | 7/2022 |
| CN | 115333899 A | 11/2022 |
| CN | 116319189 A | 6/2023 |
| WO | WO 2022151391 A1 | 7/2022 |
| WO | WO 2022151868 A1 | 7/2022 |
| WO | WO 2023000617 A1 | 1/2023 |
| WO | WO 2023019056 | 2/2023 |

OTHER PUBLICATIONS

Huawei et al., "Evaluation of DL synchronization and central frequency tracking for NTN," 3GPP TSG RAN WG1 Meeting #96bis, R1-1904001, Xi'an, China, Apr. 8-12, 2019, 5 pages.

InterDigital, Inc., "Joint channel estimation for PUSCH," 3GPP TSG RAN WG1 #106b-e, R1-2110154, e-Meeting, Oct. 11-19, 2021, 12 pages.

International Search Report and Written Opinion in International Appln. No. PCT/CN2023/082088, mailed on Nov. 24, 2023, 11 pages (with partial English translation).

Notice of Allowances in Chinese Appln. No. 202310224812.3, mailed on Jul. 16, 2023, 6 pages (with English translation).

Office Action in Chinese Appln. No. 202310224812.3, mailed on Jun. 30, 2023, 17 pages (with English translation).

Xu, "Key Technologies and Standardization of 5G-Based Non-terrestrial Networks," China Academy of Information and Communication Technology, Sep. 15, 2020, 44(9):44-48 (with English abstract).

* cited by examiner

METHOD AND APPARATUS FOR WIRELESS COMMUNICATION

CROSS-REFERENCE TO RELATED APPLICATIONS

This application is a continuation of International Application No. PCT/CN2023/082088, filed on Mar. 17, 2023, which claims priority to Chinese Patent Application No. 202310224812.3, filed with the China National Intellectual Property Administration on Mar. 10, 2023, and entitled "METHOD AND APPARATUS FOR WIRELESS COMMUNICATION". The disclosures of the aforementioned applications are hereby incorporated by reference in their entireties.

TECHNICAL FIELD

The present application relates to the field of communications technologies, and more specifically, to a method and an apparatus for wireless communication.

BACKGROUND

Some communications systems (such as a non-terrestrial network (non-terrestrial network, NTN) system) feature a relatively large propagation delay and high device mobility. In such communications systems, when a device performs joint channel estimation based on a demodulation reference signal (demodulation reference signal, DMRS) bundle, phase continuity within a specified time domain window may not be ensured. For example, in the NTN systems, satellite movement may cause rapid changes in Doppler shifts and delays, resulting in a large phase shift in the time domain window corresponding to the DMRS bundle.

SUMMARY

The present application provides a method and an apparatus for wireless communication. Various aspects of embodiments of the present application are described below.

According to a first aspect, a method for wireless communication is provided, including: determining, by a terminal device, a plurality of frequency compensation segments within a first time period based on first information, where the first information is related to a DMRS bundle used for joint channel estimation, and the first time period includes at least one time domain window corresponding to the DMRS bundle; and performing, by the terminal device, pre-compensation on an uplink channel corresponding to the first time period based on the plurality of frequency compensation segments.

In some embodiments, the first information is used to determine one or more of the following information: a time domain location within the first time period; an event that breaks phase continuity within the first time period; an A-TDW within the first time period; or a C-TDW within the first time period.

In some embodiments, the event that breaks the phase continuity within the first time period includes updating of a TA, and the TA includes a common TA and/or a TA corresponding to the terminal device.

In some embodiments, the plurality of frequency compensation segments are determined based on the A-TDW and/or C-TDW within the first time period, and a size of the A-TDW and a size of the C-TDW are dynamically adjusted based on a moving speed and/or antenna switching of a satellite in an NTN system.

In some embodiments, the time domain window corresponding to the DMRS bundle is determined based on a relative location between a satellite in an NTN system and the terminal device.

In some embodiments, the relative location between the satellite and the terminal device includes an elevation angle of the terminal device relative to the satellite, and a duration T of the time domain window corresponding to the DMRS bundle meets the following condition: $T=K\times\theta$, where $\theta$ represents the elevation angle, K represents a scale factor, and $K>0$.

In some embodiments, the first time period includes a plurality of DMRS bundles, and each of the plurality of frequency compensation segments corresponds to one or more of the DMRS bundles.

In some embodiments, the first information is further used to indicate boundaries of the plurality of frequency compensation segments, and the method further includes: determining, by the terminal device based on the boundaries of the plurality of frequency compensation segments, whether to update a TA.

In some embodiments, the plurality of frequency compensation segments include a first frequency compensation segment, and before the performing, by the terminal device, pre-compensation on an uplink channel corresponding to the first time period based on the plurality of frequency compensation segments, the method further includes: determining, by the terminal device, a first compensation value corresponding to the first frequency compensation segment, where the first compensation value is related to a frequency offset within the first frequency compensation segment.

In some embodiments, the first compensation value is determined based on one or more of the following information: a time domain location of the first frequency compensation segment within the first time period; a downlink channel received by the terminal device before the first time period; one or more DMRS symbols of the first time domain unit within the first frequency compensation segment; a second compensation value corresponding to a second frequency compensation segment before the first frequency compensation segment; or an adjustment factor related to phase continuity of the first frequency compensation segment.

In some embodiments, the first frequency compensation segment is a first-indexed frequency compensation segment within the first time period, the first compensation value is determined based on the downlink channel received by the terminal device before the first time period, and in all time domain units in the first frequency compensation segment, the pre-compensation is performed based on the first compensation value.

In some embodiments, the first frequency compensation segment is a frequency compensation segment other than the first-indexed frequency compensation segment within the first time period, the first compensation value is determined based on the second compensation value corresponding to the second frequency compensation segment before the first frequency compensation segment, and in all time domain units in the first frequency compensation segment, the pre-compensation is performed based on the first compensation value.

In some embodiments, the first compensation value is determined based on the one or more DMRS symbols of the first time domain unit within the first frequency compensation segment, and in time domain units other than the first time domain unit in the first frequency compensation segment, the pre-compensation is performed based on the first compensation value.

In some embodiments, the first compensation value is determined based on the adjustment factor related to the phase continuity of the first frequency compensation segment, and the adjustment factor is related to the first frequency compensation segment and a location of the first frequency compensation segment within the first time period.

In some embodiments, the first time period includes M first frequency compensation segments, and a compensation value for an $i^{th}$ first frequency compensation segment in the M first frequency compensation segments is $e^{-j2\pi\overline{\Delta f i}-\emptyset}$, where $\emptyset$ represents an adjustment factor for maintaining phase continuity of the $i^{th}$ first frequency compensation segment, $\Delta fi$ represents a frequency offset within the $i^{th}$ first frequency compensation segment, and j represents an imaginary unit.

In some embodiments, the frequency offset is related to a phase shift corresponding to the first frequency compensation segment, and the phase shift is determined based on one or more of the following: a Doppler shift caused by relative movement between the terminal device and a network device; or a time drift related to the terminal device and the network device.

In some embodiments, the first information is sent in one or more of the following forms: DCI, RRC signalling, or SIB information.

In some embodiments, the method further includes: sending, by the terminal device, second information to a network device, where the second information is used to indicate whether the terminal device is capable of supporting the pre-compensation.

According to a second aspect, a method for wireless communication is provided, including: sending, by a network device, first information to a terminal device, where the first information is used by the terminal device to determine a plurality of frequency compensation segments within a first time period, the first information is related to a DMRS bundle used for joint channel estimation, and the first time period is related to a time domain location corresponding to the DMRS bundle, where the plurality of frequency compensation segments are used by the terminal device to perform pre-compensation on an uplink channel corresponding to the first time period.

In some embodiments, the first information is used to determine one or more of the following information: a time domain location within the first time period; an event that breaks phase continuity within the first time period; an A-TDW within the first time period; or a C-TDW within the first time period.

In some embodiments, the event that breaks the phase continuity within the first time period includes updating of a TA, and the TA includes a common TA and/or a TA corresponding to the terminal device.

In some embodiments, the plurality of frequency compensation segments are determined based on the A-TDW and/or C-TDW within the first time period, and a size of the A-TDW and a size of the C-TDW are dynamically adjusted based on a moving speed and/or antenna switching of a satellite in an NTN system.

In some embodiments, the time domain window corresponding to the DMRS bundle is determined based on a relative location between a satellite in an NTN system and the terminal device.

In some embodiments, the relative location between the satellite and the terminal device includes an elevation angle of the terminal device relative to the satellite, and a duration T of the time domain window corresponding to the DMRS bundle meets the following condition: $T=K\times\theta$, where $\theta$ represents the elevation angle, K represents a scale factor, and $K>0$.

In some embodiments, the first time period includes a plurality of DMRS bundles, and each of the plurality of frequency compensation segments corresponds to one or more of the DMRS bundles.

In some embodiments, the first information is further used to indicate boundaries of the plurality of frequency compensation segments, and the method further includes: determining, by the network device based on the boundaries of the plurality of frequency compensation segments, whether to limit updating of a TA.

In some embodiments, the first information is sent in one or more of the following forms: DCI, RRC signalling, or SIB information.

In some embodiments, the method further includes: receiving, by the network device, second information sent by the terminal device, where the second information is used to indicate whether the terminal device is capable of supporting the pre-compensation.

According to a third aspect, an apparatus for wireless communication is provided, where the apparatus is a terminal device, and the terminal device includes: a determining unit, determining a plurality of frequency compensation segments within a first time period based on first information, where the first information is related to a DMRS bundle used for joint channel estimation, and the first time period includes at least one time domain window corresponding to the DMRS bundle; and a compensation unit, performing pre-compensation on an uplink channel corresponding to the first time period based on the plurality of frequency compensation segments.

According to a fourth aspect, an apparatus for wireless communication is provided, where the apparatus is a network device, and the network device includes: a sending unit, sending first information to a terminal device, where the first information is used by the terminal device to determine a plurality of frequency compensation segments within a first time period, the first information is related to a DMRS bundle used for joint channel estimation, and the first time period includes at least one time domain window corresponding to the DMRS bundle, where the plurality of frequency compensation segments are used by the terminal device to perform pre-compensation on an uplink channel corresponding to the first time period.

According to a fifth aspect, a communications apparatus is provided, including a memory and a processor, where the memory is configured to store a program, and the processor is configured to invoke the program in the memory to perform the method according to the first aspect or the second aspect.

According to a sixth aspect, an apparatus is provided, including a processor, invoking a program from a memory to perform the method according to the first aspect or the second aspect.

According to a seventh aspect, a chip is provided, including a processor, invoking a program from a memory to cause a device installed with the chip to perform the method according to the first aspect or the second aspect.

According to an eighth aspect, a computer-readable storage medium is provided, the computer-readable storage medium storing a program that causes a computer to perform the method according to the first aspect or the second aspect.

According to a ninth aspect, a computer program product is provided, including a program that causes a computer to perform the method according to the first aspect or the second aspect.

According to a tenth aspect, a computer program is provided, where the computer program causes a computer to perform the method according to the first aspect or the second aspect.

In embodiments of the present application, a terminal device determines a plurality of frequency compensation segments within a first time period based on first information. To be specific, the terminal device segments the first time period based on the first information, so as to perform pre-compensation on an uplink channel. The first information is related to a DMRS bundle included in the first time period. Therefore, a phase continuity requirement of the DMRS bundle is taken into consideration when the first time period is segmented for pre-compensation, thereby being beneficial to performing joint channel estimation based on a DMRS bundle in a communications system such as an NTN system.

DETAILED DESCRIPTION OF EMBODIMENTS

Figure 1:
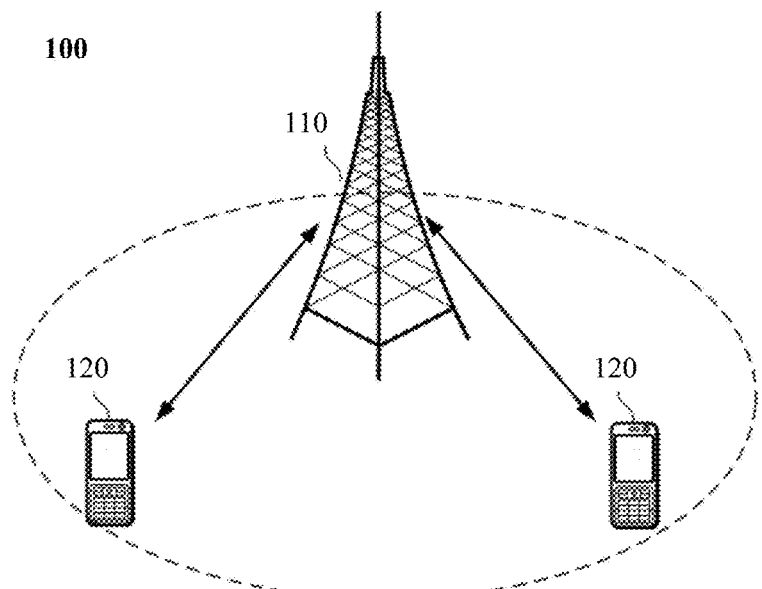
FIG. 1 shows a wireless communications system to which an embodiment of the present application is applied.

The following describes the technical solutions in embodiments of the present application with reference to the accompanying drawings in embodiments of the present application. Apparently, the described embodiments are some rather than all of embodiments of the present application. For embodiments of the present application, all other embodiments obtained by a person of ordinary skill in the art without creative efforts fall within the protection scope of the present application.

Embodiments of the present application may be applied to various communications systems. For example, embodiments of the present application may be applied to a Global System for Mobile Communications (global system of mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an advanced long term evolution (advanced long term evolution, LTE-A) system, a new radio (new radio, NR) system, an evolution system of an NR system, an LTE-based access to unlicensed spectrum (LTE-based access to unlicensed spectrum, LTE-U) system, an NR-based access to unlicensed spectrum (NR-based access to unlicensed spectrum, NR-U) system, an NTN system, a universal mobile telecommunications system (universal mobile telecommunications system, UMTS), a wireless local area network (WLAN), wireless fidelity (wireless fidelity, Wi-Fi), and a 5th generation (5th generation, 5G) communications system. Embodiments of the present application may be further applied to another communications system, such as a future communications system. The future communications system may be, for example, a 6th generation (6th generation, 6G) mobile communications system, or a satellite communications system.

Conventional communications systems support a limited number of connections and are also easy to implement. However, with the development of communications technologies, a communications system may support not only conventional cellular communication but also one or more other types of communication. For example, the communications system may support one or more types of the following communication: device-to-device (device-to-device, D2D) communication, machine-to-machine (machine-to-machine, M2M) communication, machine type communication (machine type communication, MTC), enhanced MTC (enhanced MTC, eMTC), vehicle-to-vehicle (vehicle-to-vehicle, V2V) communication, vehicle-to-everything (vehicle-to-everything, V2X) communication, and the like. Embodiments of the present application may also be applied to a communications system that supports the foregoing communication manners.

The communications system in embodiments of the present application may be applied to a carrier aggregation (carrier aggregation, CA) scenario, a dual connectivity (dual connectivity, DC) scenario, or a standalone (standalone, SA) networking scenario.

The communications system in embodiments of the present application may be applied to an unlicensed spectrum. The unlicensed spectrum may also be considered as a shared spectrum. Alternatively, the communications system in embodiments of the present application may be applied to a licensed spectrum. The licensed spectrum may also be considered as a dedicated spectrum.

Embodiments of the present application may be applied to a terrestrial network (terrestrial network, TN) system, or may be applied to an NTN system. For example, the NTN system may include a 4G-based NTN system, an NR-based NTN system, an internet of things (internet of things, IoT)-based NTN system, and a narrow band-internet of things (narrow band-internet of things, NB-IoT)-based NTN system.

The communications system may include one or more terminal devices. The terminal device mentioned in embodiments of the present application may also be referred to as user equipment (user equipment, UE), an access terminal, a subscriber unit, a subscriber station, a mobile site, a mobile station (mobile station, MS), a mobile terminal (mobile terminal, MT), a remote station, a remote terminal, a mobile device, a user terminal, a terminal, a wireless communications device, a user agent, a user apparatus, or the like.

In some embodiments, the terminal device may be a station (STATION, ST) in a WLAN. In some embodiments, the terminal device may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or any other processing device connected to a wireless modem, a vehicle-mounted device, a wearable device, a terminal device in a next generation communications system (such as an NR system) or a terminal device in a future evolved public land mobile network (public land mobile network, PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone, a tablet computer (pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, and a satellite.

In addition to the terminal device, the communications system may further include one or more network devices. The network device in embodiments of the present application may be a device for communicating with the terminal device. The network device may also be referred to as an access network device or a wireless access network device. The network device may be, for example, a base station. The network device in embodiments of the present application may be a radio access network (radio access network, RAN) node (or device) that connects the terminal device to a wireless network. The base station may broadly cover the following various names, or may be replaced with the following names: a NodeB (NodeB), an evolved NodeB (evolved NodeB, eNB), a next generation NodeB (next generation NodeB, gNB), a relay station, an access point, a transmitting and receiving point (transmitting and receiving point, TRP), a transmitting point (transmitting point, TP), a master eNode MeNB, a secondary eNode SeNB, a multi-standard radio (MSR) node, a home base station, a network controller, an access node, a radio node, an access point (access point, AP), a transmission node, a transceiver node, a baseband unit (baseband unit, BBU), a remote radio unit (remote radio Unit, RRU), an active antenna unit (active antenna unit, AAU), a remote radio head (remote radio head, RRH), a central unit (central unit, CU), a distributed unit (distributed unit, DU), a positioning node, and the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X$_n$, and M2M communications, a network-side device in a 6G network, a device that functions as a base station in a future communications system, or the like. The base station may support networks of the same or different access technologies. A specific technology and specific device form used by the network device are not limited in embodiments of the present application.

The base station may be fixed or mobile. For example, a helicopter or an unmanned aerial vehicle may be configured to function as a mobile base station, and one or more cells may move according to a location of the mobile base station. In another example, a helicopter or an unmanned aerial vehicle may be configured to function as a device in communication with another base station.

In some deployments, the network device in embodiments of the present application may be a CU or a DU, or the network device includes a CU and a DU. The gNB may further include an AAU.

As an example rather than limitation, in embodiments of the present application, the network device may have a mobile feature, for example, the network device may be a movable device. In some embodiments of the present application, the network device may be a satellite or a balloon station. In some embodiments of the present application, the network device may alternatively be a base station located on land, water, or the like.

In embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include: a metro cell, a micro cell, a pico cell, a femto cell, or the like. These small cells feature small coverage and low transmit power, and are suitable for providing a high-speed data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device within the coverage area.

FIG. 1 exemplarily shows one network device and two terminal devices. In some embodiments of the present application, the communications system 100 may include a plurality of network devices and another number of terminal devices may be included within a coverage area of each network device, which is not limited in embodiments of the present application.

Figure 2:
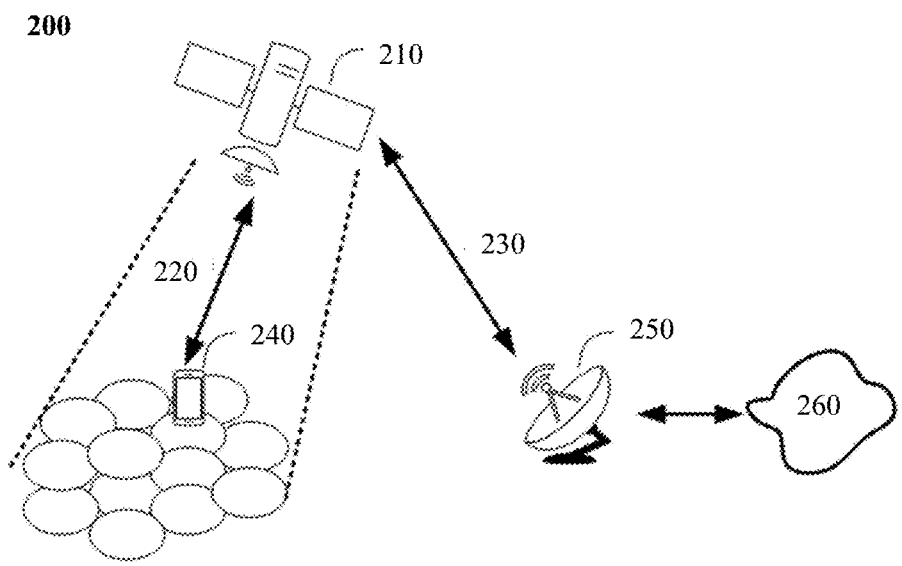
FIG. 2 is an NTN system to which an embodiment of the present application is applied.

For example, FIG. 2 is a schematic diagram of an architecture of the foregoing NTN system. As shown in FIG. 2, a satellite radio access network 200 includes a satellite 210, a service link 220, a feeder link 230, a terminal device 240, a gateway 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on an architecture.

The NTN architecture shown in FIG. 2 is a bent pipe transponder architecture. In this architecture, the base station is located on the earth behind the gateway 250, and the satellite 210 functions as a relay. The satellite 210 functions as a repeater for forwarding signals of the feeder link 230 to the service link 220, or forwarding signals of the service link 220 to the feeder link 230. In other words, the satellite 210 does not have a function of abase station, and communication between the terminal device 240 and the base station in the network 260 needs to be implemented by using the satellite 210.

Figure 3:
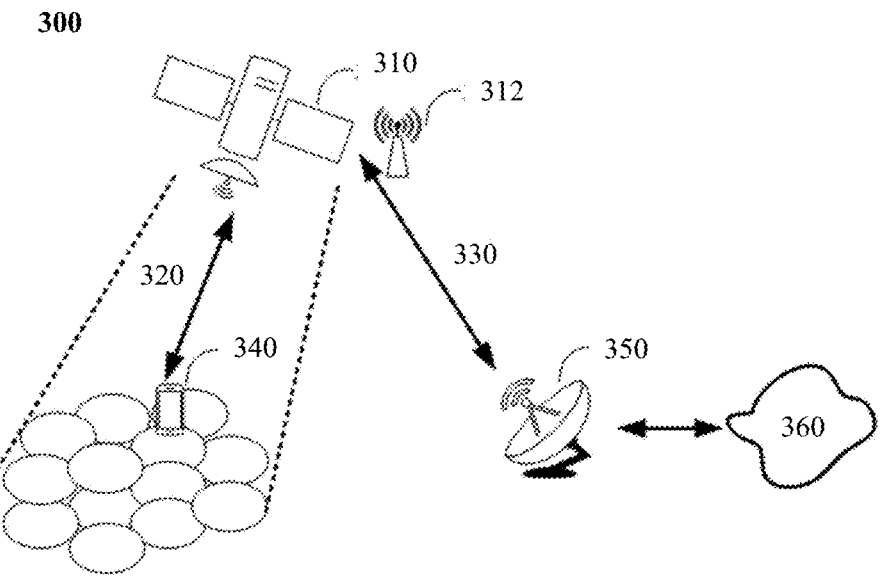
FIG. 3 is another NTN system to which an embodiment of the present application is applied.

For example, FIG. 3 is a schematic diagram of another architecture of the NTN system. As shown in FIG. 3, a satellite radio access network 300 includes a satellite 310, a service link 320, a feeder link 330, a terminal device 340, a gateway 350, and a network 360. Compared with FIG. 2, a base station 312 is provided on the satellite 310, and the network 360 behind the gateway 350 includes only a core network.

The NTN architecture shown in FIG. 3 is a regenerative transponder architecture. In this architecture, the satellite 310 carries the base station 312, and may be directly connected to an earth-based core network by using a link. The satellite 310 has a function of a base station, and a terminal device 340 may directly communicate with the satellite 310. Thus, the satellite 310 may be referred to as a network device.

The communications system in the architecture shown in FIG. 2 or FIG. 3 may include a plurality of network devices, and another number of terminal devices may be included in coverage of each network device, which is not limited in the embodiment of the present application.

In embodiments of the present application, the wireless communications system shown in FIG. 1 to FIG. 3 may further include another network entity such as a mobility management entity (mobility management entity, MME) or an access and mobility management function (access and mobility management function, AMF), which is not limited in the embodiment of the present application.

It should be understood that a device having a communication function in a network/system in embodiments of the present application may be referred to as a communications device. The communications system 100 shown in FIG. 1 is used as an example. A communications device may include the network device 110 and the terminal device 120 having a communication function, and the network device 110 and the terminal device 120 may be specific devices described above, and details are not described herein. The communications device may further include other devices in the communications system 100, such as a network controller, a mobility management entity, and other network entities, which is not limited in embodiments of the present application.

For ease of understanding, some related technical knowledge related to embodiments of the present application is first introduced. The following related technologies, as optional solutions, may be randomly combined with the technical solutions of embodiments of the present application, all of which fall within the protection scope of embodiments of the present application. Embodiments of the present application include at least part of the following content.

With the development of communications technologies, a communications system (for example, 5G) will have a market potential for integrating a satellite and a terrestrial network infrastructure. For example, 5G standards cause an NTN, including a satellite segment, to become a part of recognized 3rd generation partnership project (3rd generation partnership project, 3GPP) 5G connection infrastructure.

Communications satellites are classified into low earth orbit (low earth orbit, LEO) satellites, medium earth orbit (medium earth orbit, MEO) satellites, geostationary earth orbit (geostationary earth orbit, GEO) satellites, high elliptical orbit (high elliptical orbit, HEO) satellites, and the like depending on different orbital altitudes. LEO is an earth-centered orbit with a height of 2,000 km or less, or at least 11.25 periods per day, and an eccentricity being less than 0.25. Most artificial objects in outer space are located in LEO. The LEO satellites operate around the earth at a high speed (mobility), but on a predictable or definite orbit.

Satellites with different orbital altitudes have different orbital periods.

LEO has a typical height ranging from 250 km to 1,500 km, and an orbital period ranging from 90 minutes to 120 minutes.

EO has a typical height ranging from 5,000 km to 25,000 km, and an orbital period ranging from 3 hours to 15 hours.

GEO has a height of about 35786 km, and an orbital period of 24 hours.

An NTN is a network or a network segment that uses a radio frequency (radio frequency, RF) resource on a satellite or an unmanned aerial system (unmanned aerial system, UAS) platform. A typical scenario of accessing an NTN by a terminal device involves an NTN transparent payload or an NTN regenerative payload. FIG. 2 and FIG. 3 show architectures of two NTN systems by using a satellite as an example. The bent pipe transponder architecture shown in FIG. 2 corresponds to the NTN transparent payload, and the regenerative transponder architecture shown in FIG. 3 corresponds to the NTN regenerative payload.

In an NTN system, an NTN node (for example, a satellite) is located away from the surface of the earth for more than hundreds of kilometers, and a round-trip time (round-trip time, RTT) from a terminal device to the satellite is relatively long. Therefore, a round-trip time from the terminal device to the NTN node is much longer than a round-trip time from the terminal device to a network device in a terrestrial network. In the relevant specifications, for a propagation delay from the terminal device (UE) to the satellite, reference may be made to Table 1.

TABLE 1

Propagation delays between the UE and the satellite

| | Delays between the UE and the satellite/ms | | One-way maximum propagation delay/ms |
|---|---|---|---|
| | Minimum value | Maximum value | |
| LEO | 3 | 15 | 30 |
| MEO | 27 | 43 | 90 |
| GEO | 120 | 140 | 280 |

When the NTN network uses a radio frequency resource of the satellite for communication, communications satellites with different orbital altitudes have different moving speeds relative to the earth. For example, a LEO satellite in a low earth orbit moves at a faster speed, while a GEO satellite in a high earth orbit is stationary relative to the earth.

For a data transmission manner in the NTN system, one may refer to a TN system. In a data transmission process, a signal used for demodulation of uplink and downlink data is a DMRS. In an NR system, there are two DMRS designs, namely, a front-loaded DMRS and an additional DMRS.

The front-loaded DMRS is a signal that appears for the first time. In each time unit for scheduling, a location at which the DMRS appears for the first time should be as close to a start point of the scheduling as possible. For slot-based scheduled transmission (such as Type A), a location of a front-loaded DMRS pilot should be located immediately behind a physical downlink control channel (physical downlink control channel, PDCCH) region. In other words, a location of the front-loaded DMRS usually depends on a configuration of the PDCCH. If the PDCCH occupies the first two orthogonal frequency division multiplexing (orthogonal frequency division multiplexing, OFDM) symbols, the DMRS starts from the third symbol. If the PDCCH occupies the first three OFDM symbols, the DMRS starts from the fourth symbol. For non-slot-based scheduled transmission (such as Type B), since a scheduling unit is less than one slot, a front-loaded DMRS pilot is transmitted starting from the first symbol of a scheduling region.

The additional DMRS is a repetition of the front-loaded DMRS. In medium-speed and high-speed mobile scenarios, more DMRS pilot symbols need to be inserted within a scheduling duration to meet an estimation precision requirement of time-varying characteristics of channels. Therefore, the NR uses a combination of the front-loaded DMRS and the additional DMRS. Specifically, a pattern of each group of additional DMRS pilots is a repetition of front-loaded DMRS pilots, to be specific, each group of additional DMRS pilots and the front-loaded DMRS pilots occupy the same subcarriers and the same number of OFDM symbols.

In Rel-17, joint channel estimation across a plurality of consecutive slots is introduced for coverage enhancement. In joint channel estimation, DMRSs of a plurality of consecutive slots may be used to perform channel estimation to improve accuracy of channel estimation, thereby effectively improving corresponding channel coverage performance. For example, a channel state between a terminal device at an edge of a cell and a network device is often poor and a signal to interference plus noise ratio on a terminal device side is relatively low. The network device uses joint channel estimation, so that accuracy of uplink channel estimation can be improved, demodulation performance of received signals can be improved, and therefore, corresponding channel coverage can be improved.

In the joint channel estimation, the network device instructs, by configuring related signalling, the terminal device to perform DMRS bundling in an uplink transmission process. A main limitation of the DMRS bundling is to maintain power consistency and phase continuity. To support the DMRS bundling, phase continuity requirements that need to be met are defined in related technical specifications. For example, in requirements of the technical specification TS 38.101-1[3], for a frequency division duplexing (frequency division duplexing, FDD) band and a DMRS bundling configuration supporting 16 slots, a maximum allowed phase difference between a slot 0 and any slot "p" to which DMRS bundling is applied is only 30 degrees. For another example, for an FDD band and a DMRS bundling configuration supporting less than or equal to 8 slots, a maximum allowed phase difference between any two consecutive slots (for example, slots "p−1" and "p") to which DMRS bundling is applied cannot exceed 25 degrees.

A configured time domain window (configured time domain window, C-TDW) is introduced in the joint channel estimation to specify a duration of channel bonding. The C-TDW may also be referred as a nominal TDW. Usually, a duration of a TDW may be represented by a number of consecutive slots. Except for the last C-TDW, a duration of each C-TDW may be configured by a higher layer.

In a standardized design of joint channel estimation, design structures of a plurality of types of time domain windows corresponding to DMRS bundles are discussed. A two-stage structure combining a C-TDW and an actual time domain window (actual time domain window, A-TDW) is a usual structure for joint channel estimation. The terminal device may determine an A-TDW for a DMRS bundle according to a specific principle based on a C-TDW configured by a base station. For example, the first A-TDW starts at the first symbol of channel transmission and ends before an event occurs. The event is an event that may cause power consistency or phase continuity to be broken. The event includes a transmission drop/cancel event defined based on Rel-15/16 conflict rules, and other defined factors that may break power consistency or phase continuity. When an event occurs, the terminal device may determine whether to start a new A-TDW based on a configuration, an event type, and a capability of the terminal device. The A-TDW also ends when the channel transmission ends.

Transmission of a physical uplink shared channel (physical uplink shared channel, PUSCH) is used as an example, where the terminal device may define a C-TDW and an A-TDW when performing PUSCH transmission. The C-TDW includes one or more consecutive slots, and one or more C-TDWs together cover all PUSCH repeated transmissions in time domain. Further, within each C-TDW, one or more A-TDWs may be implicitly determined, and the A-TDWs determine a PUSCH transmission for which joint channel estimation may actually be performed. In other words, the network device expects the terminal device to maintain power consistency and phase continuity within each A-TDW.

For ease of understanding, a detailed description is made below with reference to FIG. 4 by using, as an example, a time domain window for a DMRS bundle corresponding to a PUSCH repeated transmission.

Figure 4:
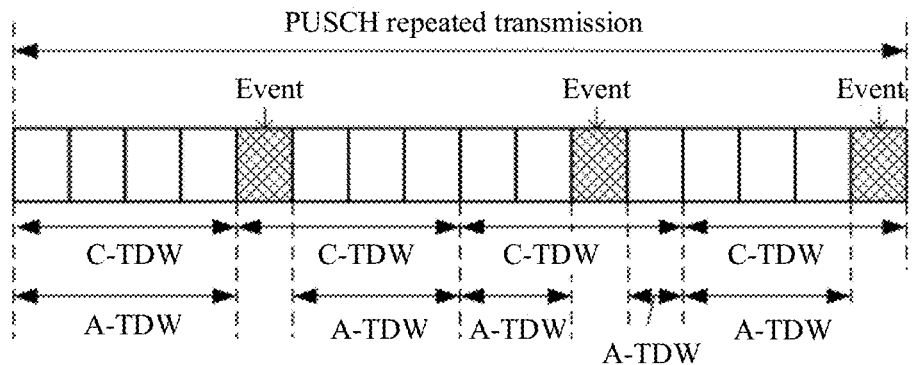
FIG. 4 is a schematic diagram of a time domain window corresponding to a DMRS to which an embodiment of the present application is applied.

Reference is made to FIG. 4. The time domain window for the DMRS bundle includes 16 slots. A number of PUSCH repeated transmissions is 16, and a length of a C-TDW is configured as four slots. In other words, all PUSCH repeated transmissions are covered by four C-TDWs within the time domain window.

Reference is made to FIG. 4 again. A start slot and an end slot of an A-TDW are both related to a C-TDW and an event. As shown in FIG. 4, the A-TDW does not cover a repeated transmission corresponding to an event. A start slot of an A-TDW may be a start slot of each C-TDW, or a next slot of an event. An end slot of A-TDW may be an end slot of each C-TDW, or may be a slot before an event occurs. Therefore, within a C-TDW, an A-TDW is generated only after an event ends.

A DMRS bundle for joint channel estimation is described above with reference to FIG. 4. A current DMRS bundling standard is specified based on the TN system. Because the round-trip delay variation in the TN system is very low, a phase may maintain continuity required by the specifications when the terminal device does not perform autonomous TA adjustment during an A-TDW. However, for the communications system mentioned above that has high mobility such as the NTN, due to network characteristics such as large propagation delay and device mobility, it can not be ensured that a phase continuity requirement based on a DMRS bundle in the above specifications is met.

The NTN system is used as an example. Because a distance between a satellite and a terminal device is relatively long, a transmission delay is large. A large propagation delay may result in a large timing advance (timing advance, TA) value, an offset in a timing relationship between a downlink and an uplink, and misalignment between a downlink slot index on a network device side and an uplink slot index on a terminal device side. Further, rapid movement of the satellite may also cause rapid changes in a delay, and the terminal device needs to frequently adjust the TA to perform pre-compensation in time domain. In other words, the satellite moves very fast. This may significantly change a round-trip delay, and then causes phase discontinuity and time asynchronization. The change in the round-trip delay may cause a time drift. The time drift may also be referred to as a timing drift or a delay drift. A phase of the terminal device may shift due to the time drift. The phase shift is also referred to as a phase shift. The phase shift caused by the time drift may be calculated by using the following formula:

$$\varphi = 2\pi \times \delta f/2 \times \Delta T$$

In which, φ is the phase shift, δf is a channel bandwidth, ΔT is a maximum round-trip delay variation.

In the NTN system, the communications device may derive the time drift to determine the phase shift. For a service link, the time drift may be derived based on a location of the terminal device and an ephemeris of the satellite; and for a feeder link, the time drift may be derived based on a common TA drift.

The NTN system is still used as an example. Relative movement between the satellite and the terminal device may cause a relatively high Doppler shift. The terminal device needs to perform pre-compensation for a frequency offset caused by a high Doppler shift to maintain frequency synchronization. In particular, a low-orbit satellite moves at a relatively fast speed. This may also cause a rapid change in a Doppler shift. The high Doppler shift and the rapid change in the Doppler shift may both cause a phase of uplink channel transmission of the terminal device to shift. The phase shift caused by the Doppler shift is mainly caused by a frequency drift during a repetition duration. Specifically, the phase shift caused by the Doppler shift may be calculated by using the following formula:

$$\varphi = 2\pi \times f \times t$$

where φ is the phase shift, f is the Doppler shift, and t is a duration.

In conclusion, in the communications system such as the NTN, the phase shift of the terminal device is affected by a Doppler shift and a time drift, and may be much greater than a phase shift in the TN system.

In such communications systems, when a communications device performs joint channel estimation based on a DMRS bundle, phase continuity within a specified time domain window may not be ensured. If the terminal device does not perform frequency pre-compensation, a Doppler shift change may be a main factor causing a phase difference. For example, if the terminal device does not update a frequency pre-compensation value during a TDW period of LEO-1200, the phase difference cannot meet a phase difference requirement of a DMRS bundle.

To solve some of the foregoing problems, an embodiment of the present application provides a method for wireless communication. According to this method, a terminal device takes a phase continuity requirement of a DMRS bundle into consideration when a first time period is segmented for pre-compensation, thereby being beneficial to performing joint channel estimation based on a DMRS bundle in a communications system such as an NTN. The following describes a method embodiment in embodiments of the present application in detail with reference to FIG. 5.

Figure 5:
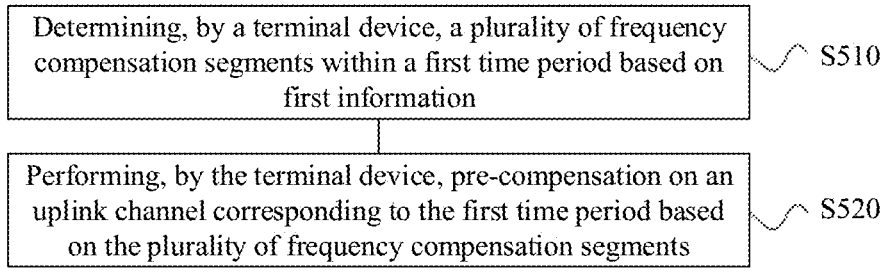
FIG. 5 is a schematic flowchart of a method for wireless communication according to an embodiment of the present application.

Reference is made to FIG. 5. Step S510: Determining, by a terminal device, a plurality of frequency compensation segments within a first time period based on first information.

The terminal device may be any device described above that communicates with a network device. In some embodiments, the terminal device may be a device in an NTN system that communicates with an air platform via a service link, or may be a gateway that communicates with the air platform via a feeder link. The air platform is, for example, a satellite, or a UAV system.

The network device is a communications device that provides a network service for the terminal device. In some embodiments, the network device that communicates with the terminal device may be a satellite in an NTN system.

The terminal device may receive the first information dynamically configured by the network device, or the first information may be determined according to pre-configuration or pre-definition of the network device. This is not limited herein.

In some embodiments, the network device may send the first information to the terminal device in a plurality of forms. For example, the network device may indicate the first information to the terminal device by using downlink control information (downlink control information, DCI). For another example, the network device may send the first information to the terminal device by using radio resource control (radio resource control, RRC) signalling. For another example, the network device may perform pre-definition by using RRC signalling, and further indicate a related parameter value by using DCI. For another example, the network device may send the first information to the terminal device by using system information block (system information block, SIB) information.

The first information may be used to assist the terminal device in performing an operation related to a DMRS bundle. In some embodiments, the first information may include information such as a duration of a DMRS bundle, configuration information of a C-TDW, or an event within a DMRS bundling window. The terminal device may send an uplink channel based on the information. For example, the terminal device may repeatedly transmit a PUSCH to the network device by using time domain resources corresponding to the DMRS bundle, so that the network device may perform joint channel estimation. In other words, the first information may be related to a DMRS bundle for joint channel estimation. For another example, the terminal device may determine a start slot and an end slot of an A-TDW within a DMRS bundling window based on the first information, to determine a time period in which power consistency and phase continuity need to be ensured. For another example, the terminal device may determine, based on the first information, an event indicated by the network device, to determine a time domain window structure within the DMRS bundling window.

It may be learned from the foregoing that the DMRS bundling window is a time domain window corresponding to the DMRS bundle, and resources corresponding to the time domain window may be used for a repeated transmission of the uplink channel. In some embodiments, the uplink channel may be a PUSCH, or may be a physical uplink control channel (physical uplink control channel, PUCCH).

The first information may alternatively be used by the terminal device to determine the first time period in which time-frequency pre-compensation needs to be performed. As mentioned above, in the NTN system, the terminal device needs to perform time-frequency pre-compensation on the uplink channel to reduce the phase discontinuity and time asynchronization caused by the large propagation delay and the high Doppler shift. The first time period may be a time domain resource used by the terminal device to send the uplink channel based on one or more DMRS bundles. Therefore, the first time period may be determined based on the time domain resources of the uplink channel to be sent, or may be determined based on the DMRS bundling window corresponding to the uplink channel. For example, the terminal device needs to perform 16 PUCCH repeated transmissions, and the first time period may correspond to 16 slot resources. For another example, the first time period may be determined based on the DMRS bundling window of the uplink channel of the terminal device.

The first time period may include at least one time domain window corresponding to a DMRS bundle. For example, the first time period may include only one time domain window corresponding to a DMRS bundle. In other words, the first time period is one DMRS bundling window. For another example, the first time period may span a plurality of DMRS bundling windows, so that the terminal device may determine a plurality of frequency compensation segments and perform corresponding time-frequency pre-compensation.

In some embodiments, the time domain window corresponding to the DMRS bundle may be determined based on a relative location between a satellite in an NTN system and the terminal device. For example, a duration of the DMRS bundling window may be determined based on an elevation angle between the satellite and the terminal device. The elevation angle between the satellite and the terminal device is an elevation angle of the terminal device relative to the satellite. The elevation angle is an included angle between the ground and a line connecting the satellite and the terminal device, namely, an altitude angle of the satellite relative to the ground, which is an angle relative to a horizontal plane. The elevation angle ranges from 0° to 90°.

As a possible implementation, the duration of the DMRS bundling window may be determined based on the elevation angle. The elevation angle is proportional to a bundling time. A larger elevation angle indicates a longer DMRS bundling time. For example, when T represents the duration of the DMRS bundling window, T may meet the following condition:

$T = K \times \theta$, where $\theta$ represents the elevation angle between the satellite and the terminal device, K represents a scale factor, and $K > 0$.

The first information may be used to determine one or more types of information within the first time period, so that the terminal device segments the first time period based on pre-compensation. The information may be, for example, a time domain location within the first time period, for another example, an event that breaks phase continuity within the first time period, for another example, an A-TDW within the first time period, and for another example, a C-TDW within the first time period. As a possible implementation, the first information may directly indicate the information listed above, or may be used by the terminal device to determine the information listed above.

The event that breaks phase continuity within the first time period may include a plurality of events mentioned above, or may include updating of a TA. The TA includes a common TA and/or a TA corresponding to the terminal device. The TA corresponding to the terminal device may also be referred to as a specific TA. The terminal device may update the common TA or specific TA between DMRS bundling windows or within each DMRS bundling window. For example, in the NTN system, the terminal device may manage a specific TA of the terminal device based on information such as an ephemeris of the satellite, a global navigation satellite system (global navigation satellite system, GNSS), or a network configuration. Specifically, the terminal device may update and derive the specific TA of the terminal device and a common TA based on ephemeris information of the satellite and a related RRC parameter respectively. TA changes on a terminal device side may cause phase discontinuity between uplink transmissions.

The A-TDW and the C-TDW within the first time period may be related to movement information and/or coverage performance of the network device. For example, in the NTN system, a size of the TDW may be dynamically adjusted based on a moving speed of the satellite. To be specific, a size of the A-TDW and a size of C-TDW may be dynamically adjusted based on the moving speed of the satellite in the NTN system. For example, the terminal device may determine a configuration parameter of the C-TDW based on movement information of the satellite. The terminal device may determine the size of A-TDW based on the C-TDW and an occurrence time of an event. For example, in the NTN system, the coverage performance of the satellite may be adjusted by antenna switching of the satellite. Therefore, the size of A-TDW and the size of C-TDW may alternatively be dynamically adjusted based on the antenna switching of the satellite in the NTN system. For example, in the NTN system, the size of the TDW may alternatively be dynamically adjusted according to both the moving speed and antenna switching of the satellite.

As a possible implementation, the antenna switching is used as an event to trigger the A-TDW for the DMRS bundle to end within the C-TDW. A coverage gap of a PUSCH sent based on voice over internet protocol (voice over internet protocol, VoTP) may be eliminated by using the antenna switching and the DMRS bundle together. When the DMRS bundle is used, phase continuity or power consistency during a TDW of the DMRS bundle may limit a possibility of the antenna switching. Therefore, the antenna switching can be performed only at a boundary between DMRS bundles. A smaller antenna switching interval (for example, 20 ms for uplink VoTP) may use a larger space diversity during a transmission time, while a larger TDW may generate a larger channel estimation gain. Therefore, when the DMRS bundle and the antenna switching are used together, a required signal noise ratio (signal noise ratio, SNR) does not decrease as the size of the TDW increases, which also applies to the case of the antenna switching interval. When the A-TDW and the antenna switching interval are equal to a specific value, the coverage performance of the satellite may achieve the best trade-off among a spatial diversity gain, a channel coding gain, and a joint channel estimation gain. It may be learned that the A-TDW is determined by the C-TDW and the antenna switching interval together, thereby being beneficial to achieving the best trade-off between a phase continuity requirement of channel estimation and a larger spatial diversity gain of antenna switching.

In some embodiments, the terminal device may determine the time domain location of the first time period based on the first information. The time domain location of the first time period may be a start time domain location and an end time domain location of the first time period, may be the start time domain location and the duration of the first time period, may be the duration and the end time domain location of the first time period, or may be the start time domain location, the end time domain location and the duration of the first time period. For example, the first information includes information about a plurality of consecutive DMRS bundling windows, and the terminal device may determine the duration of the first time period based on continuity of adjacent DMRS bundling windows. If the first time period spans across a plurality of time domain windows corresponding to a DMRS bundle, the time domain location of the first time period may be determined based on the plurality of time domain windows. For another example, the first information only indicates information related to one DMRS bundle, and the first time period may be consistent with a time domain window corresponding to the DMRS bundle.

In some embodiments, the terminal device may determine, based on the first information, the event that breaks phase continuity and the C-TDW within the first time period. For example, the terminal device may determine, based on indication information of the network device about each DMRS bundle, an event that breaks power consistency and phase continuity and the C-TDW within the first time period.

In some embodiments, the terminal device may determine the A-TDW within the first time period based on the first information. For example, the terminal device may determine the A-TDW within the first time period based on each DMRS bundling window and an event corresponding to the DMRS bundling window, and C-TDW configuration information.

The terminal device may determine a plurality of frequency compensation segments within the first time period based on the first information. The frequency compensation segment refers to a time period for performing pre-compensation on an uplink channel, and may also be referred to as a UL segment or a UL segment. The terminal device may directly segment the first time period based on the first information, or may segment the first time period based on the above information determined from the first information.

In some embodiments, the terminal device may directly segment the first time period based on the first information. In other words, the network device may indicate the first time period and a segmentation manner of the first time period to the terminal device by using the first information. As a possible implementation, the network device may configure a plurality of frequency compensation segments by using DCI. As another possible implementation, the network device may indicate or configure a plurality of frequency compensation segments to the terminal device by using RRC signalling. As another possible implementation, the network device may configure a pre-defined bundling parameter (bundling size) or a specified subset of bundling parameters to the terminal device by using RRC signalling, and then indicate a specified value in the subset by using DCI.

In some embodiments, the first terminal device may update pre-compensation based on an indication of the network device. The network device may indicate, by using the first information, time domain resources used for a repeated transmission of the uplink channel. An update time instant of the terminal device for pre-compensation may be indicated through configuration of the time domain resources. As a possible implementation, when the terminal device performs a repeated transmission of an uplink channel based on a plurality of consecutive slots, pre-compensation updating may be forbidden within a segment of consecutive slots, and pre-compensation updating may be allowed only at an interval between different time periods. A length of each time period may be configured by the network device by using RRC signalling. The network device may determine the length of the time period based on a drift rate. In the NTN system, the drift rate may be estimated based on the ephemeris of the satellite.

In some embodiments, the terminal device may segment the first time period based on the time domain location of the first time period or the event, the A-TDW, or the C-TDW within the first time period. A detailed description is made below with reference to FIG. 7.

It should be noted that an update between frequency compensation segments of the terminal device may alternatively be defined as an event that breaks power consistency and phase continuity. This definition may be specified by an upper layer.

Step S520: Performing, by the terminal device, pre-compensation on an uplink channel corresponding to the first time period based on the plurality of frequency compensation segments.

The terminal device performs pre-compensation based on the plurality of frequency compensation segments to maintain time and frequency continuity within each frequency compensation segment. In some embodiments, the terminal device may perform pre-compensation for each frequency compensation segment based on the plurality of segments of the first time period. In some embodiments, the terminal device may perform pre-compensation for some of the frequency compensation segments based on the plurality of segments of the first time period. In some embodiments, when the first time period includes a plurality of consecutive slots, the terminal device may segment the first time period based on the slots.

As a possible implementation, the terminal device may cause a time and a frequency within each frequency compensation segment continuous through pre-compensation, but can not ensure continuity within different frequency compensation segments. As another possible implementation, the terminal device may keep a time and a frequency within the plurality of frequency compensation segments continuous through pre-compensation.

The terminal device may perform pre-compensation for each frequency compensation segment through channel estimation and/or frequency offset estimation. In some embodiments, if uplink transmission and downlink transmission have the same path loss and Doppler shift, the terminal device may perform estimation based on a received downlink channel. Based on an estimated channel response of a downlink, a frequency offset value is determined by using a DMRS symbol, to perform pre-compensation. The frequency offset value may be used to determine a compensation value for pre-compensation. The compensation value may also be referred to as a pre-compensation value or a pre-compensation number. In some embodiments, the terminal device may perform frequency offset estimation and frequency compensation based on one or more DMRS symbols of the first time domain unit within a frequency compensation segment. The first time domain unit may be the first slot. In some embodiments, the terminal device may determine a compensation value of a current frequency compensation segment based on compensation statuses of adjacent frequency compensation segments. In some embodiments, the terminal device may set corresponding adjustment factors for the plurality of frequency compensation segments based on phase continuity. The frequency compensation segments may have the same adjustment factor or different adjustment factors.

The terminal device may perform pre-compensation for each frequency compensation segment in a plurality of manners. A manner of the pre-compensation may be determined by a time domain location of a first frequency compensation segment within the first time period. A detailed description is made below with reference to FIG. 7 to FIG. 9.

Before performing pre-compensation for the plurality of frequency compensation segments based on the first information, the terminal device further needs to inform the network device whether segmentation for pre-compensation is supported. In other words, the network device sends the first information for segmentation for pre-compensation to the terminal device only when the network device knows that the terminal device is capable of segmentation for pre-compensation. In some embodiments, the terminal device may send second information to the network device. The second information may be used to indicate whether the terminal device is capable of supporting segmentation for pre-compensation. In other words, for joint channel estimation based on a DMRS bundle, the network device supports the terminal device in reporting a capability indication of segmentation for pre-compensation.

It may be learned from FIG. 5 that the terminal device may perform segmentation for pre-compensation on the uplink channel within the first time period. The segmentation for pre-compensation may include time and frequency pre-compensation. As mentioned above, both time inconsistency and a frequency offset may cause a phase shift. The segmentation for pre-compensation can ensure phase continuity when the network device performs joint channel estimation. If the terminal device directly performs pre-compensation for the first time period including one or more DMRS bundling windows, a compensation value may not be able to avoid breaking of phase continuity caused by an event.

Figure 6:
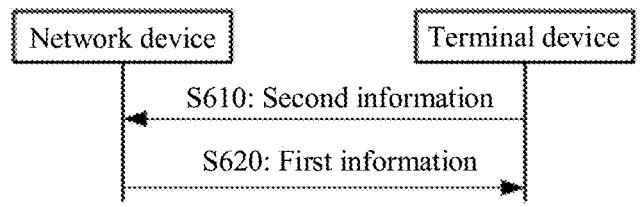
FIG. 6 is a schematic flowchart of another method for wireless communication according to an embodiment of the present application.

The method of the embodiment of the present application is described in FIG. 5 from the perspective of the terminal device, and the following description is made from the perspective of interaction between the terminal device and the network device with reference to FIG. 6. For brevity, names appearing in FIG. 5 are not further explained.

Reference is made to FIG. 6. Step S610: Sending, by a terminal device, second information to a network device. As mentioned above, the second information may be used to report a capability of the terminal device to the network device.

In some embodiments, the second information may alternatively be used by the terminal device to indicate to the network device whether the terminal device determines updating of a TA based on segmentation for obtaining frequency compensation segments. If the terminal device determines, based on boundaries of the frequency compensation segments, whether to update the TA, the network device may limit the updating of the TA of the terminal device within the frequency compensation segments to ensure phase continuity within the frequency compensation segments. For example, the network device may prevent, through RRC indication, the terminal device from updating the TA of the terminal device and occurrence of an emergency during a DMRS bundling window. In this case, a frequency compensation segment in the DMRS bundling window is continuous. In other words, the DMRS bundling window corresponds to one frequency compensation segment. The terminal device may determine a frequency compensation value for an entire DMRS period through a single frequency offset estimation.

Step S620: Sending, by the network device, first information to the terminal device. Operations performed in this step are the same as that in Step S510 of FIG. 5 and details are not described herein again.

As mentioned above, the terminal device may directly determine a plurality of frequency compensation segments based on the first information of the network device, or may segment the first time period based on the first information. For both of the two manners described above, segmentation may be performed based on a plurality of pieces of information determined based on the first information mentioned above. A specific segmentation manner is described below with reference to FIG. 7.

Figure 7:
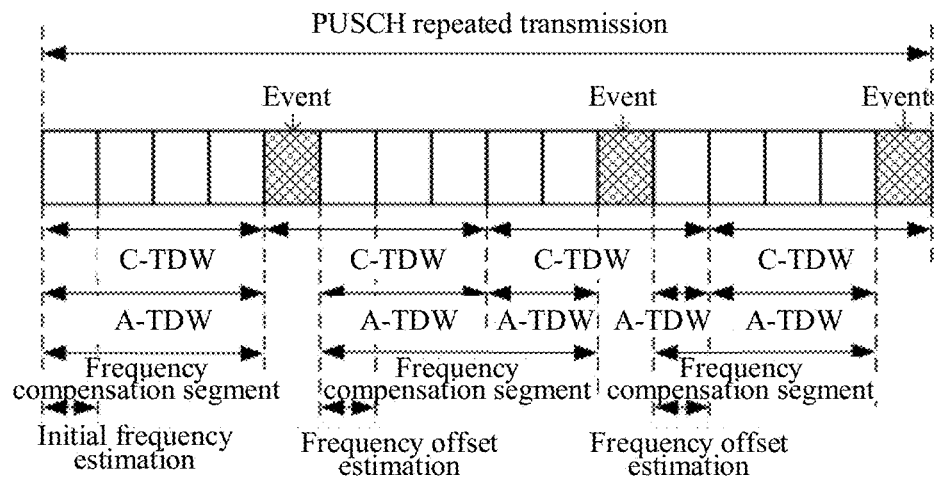
FIG. 7 is a schematic diagram of a possible implementation of a method according to an embodiment of the present application.

In some embodiments, the plurality of frequency compensation segments may be obtained based on the time domain location of the first time period and the event that breaks phase continuity within the first time period. Specifically, a start time domain location of the first frequency compensation segment in the plurality of frequency compensation segments may be determined based on a start location of the first time period. An end time domain location of the first frequency compensation segment may be determined based on an event occurred within the first time period. In other words, when an event occurs, the frequency compensation segment ends. When the event ends, a new frequency compensation segment is generated. An end time domain location of the last frequency compensation segment in the plurality of frequency compensation segments may be determined based on an end location of the first time period. As shown in FIG. 7, a PUSCH repeated transmission is performed by using 16 slots for the first time period. The first time period includes three events that are located in the fifth slot, the eleventh slot, and the last slot respectively. According to the foregoing principle, the first time period shown in FIG. 7 includes three frequency compensation segments. The first frequency compensation segment covers slots 1 to 4, the second frequency compensation segment covers slots 6 to 10, and the third frequency compensation segment covers slots 12 to 15.

In some embodiments, the segmentation manner for obtaining the plurality of frequency compensation segments may alternatively be determined based on the A-TDW within the first time period. The A-TDW is determined by the terminal device based on the C-TDW for the DMRS bundle and an event, and the frequency compensation segment may be determined based on a time period corresponding to the A-TDW. As a possible implementation, the frequency compensation segment may be greater than the A-TDW, may be equal to the A-TDW, or may be less than the A-TDW. As a possible implementation, the frequency compensation segment may include one or more A-TDWs. As shown in FIG. 7, the first frequency compensation segment is equal to the first A-TDW. The second frequency compensation segment and the third frequency compensation segment each include two A-TDWs. It should be noted that if the network device instructs to prevent an emergency from occurring within a specific time domain window, a plurality of frequency compensation segments may be continuous even if the plurality of frequency compensation segments are obtained through uplink segmentation based on the A-TDW.

In some embodiments, the segmentation manner for obtaining the plurality of frequency compensation segments may alternatively be determined based on the C-TDW and an event within the first time period. The C-TDW may cover all time domain windows corresponding to a DMRS bundle. The frequency compensation segment may correspond to one or more C-TDWs based on an event. As a possible implementation, the frequency compensation segment may be greater than the C-TDW, or may be less than the C-TDW. As shown in FIG. 7, the first frequency compensation segment is equal to the first C-TDW. The second frequency compensation segment and the third frequency compensation segment each correspond to two C-TDWs. It should be noted that if the network device instructs to prevent an emergency from occurring within a specific time domain window, a plurality of frequency compensation segments may be continuous even if the plurality of frequency compensation segments are obtained through uplink segmentation based on the C-TDW.

In some embodiments, the segmentation manner for obtaining the plurality of frequency compensation segments may alternatively be determined based on the time domain window corresponding to the DMRS bundle. For example, if the phase is continuous, no phase discontinuity occurs due to TA adjustment or an event, and the frequency compensation segment may span one or more DMRS bundling windows. To be specific, when the first time period includes a plurality of DMRS bundles, each of the plurality of frequency compensation segments corresponds to one or more of the DMRS bundles. For example, the first time period in FIG. 7 includes only one DMRS bundling window, and each of the three frequency compensation segments corresponds to one DMRS bundle. For example, when the first time period includes a plurality of DMRS bundling windows, the frequency compensation segment may correspond to the two or more DMRS bundles with continuous phases if phases of adjacent slots of two or more DMRS bundling windows are continuous.

In some embodiments, when the network device directly indicates boundaries of the plurality of frequency compensation segments by using the first information, the terminal device may further determine, based on the boundaries of the plurality of frequency compensation segments, whether to update a TA. To be specific, the terminal device may determine, based on the segmentation manner for obtaining the plurality of frequency compensation segments, when to adjust or update the TA. For the network device, the network device may limit the updating of the TA of the terminal device within the frequency compensation segments. For example, the network device may determine, based on the boundaries of the plurality of frequency compensation segments, whether to limit the updating of the TA.

The foregoing describes the segmentation manner for obtaining the plurality of frequency compensation segments within the first time period, and the terminal device may perform compensation for the plurality of frequency compensation segments based on the segmentation. Compensation manners for the frequency compensation segments may be the same or different.

Usually, the terminal device needs to perform calculation and pre-compensation before a repeated transmission of the uplink channel to ensure phase continuity. For better pre-compensation for the frequency compensation segment, accurate frequency offset estimation needs to be performed to determine a compensation value. The compensation value may be related to a frequency offset. The frequency offset may cause a phase shift corresponding to the first frequency compensation segment, and consequently resulting in phase discontinuity. Therefore, performing frequency pre-compensation on the uplink channel can improve phase continuity. As mentioned above, the phase shift may be determined based on a Doppler shift caused by relative movement between the terminal device and the network device, and may also be determined based on a time drift between the terminal device and the network device. By performing pre-compensation, a residual frequency offset of the terminal device is expected to be controlled to be 0.1 PPM. The frequency offset is mainly determined by a local crystal oscillator of the terminal device. To be specific, the residual frequency offset may be obtained based on combined inaccuracy at local oscillator of the terminal device, an autonomous time of the terminal device that is based on a location of the terminal device and ephemeris information of a serving satellite, and a compensation value of the frequency pre-compensation.

In the plurality of frequency compensation segments in the first time period, a frequency compensation segment for which the terminal device needs to perform pre-compensation may be referred to as the first frequency compensation segment. To be specific, the first frequency compensation segment may represent each of the plurality of frequency compensation segments. A compensation value corresponding to the first frequency compensation segment is a first compensation value. Before performing pre-compensation for the first frequency compensation segment, the terminal device may determine the first compensation value corresponding to the first frequency compensation segment.

As mentioned above, the terminal device may perform pre-compensation through channel estimation and/or frequency offset estimation. To be specific, the first compensation value may alternatively be determined based on one or more of the following information, for example, a time domain location of the first frequency compensation segment within the first time period; a downlink channel received by the terminal device before the first time period; one or more DMRS symbols of the first time domain unit within the first frequency compensation segment; a second compensation value corresponding to a second frequency compensation segment before the first frequency compensation segment; or an adjustment factor related to phase continuity of the first frequency compensation segment.

It should be noted that the time domain unit mentioned in the embodiment of the present application may be a slot, a symbol, or another specified time domain unit. This is not limited herein.

In some embodiments, when the first frequency compensation segment is a first-indexed frequency compensation segment within the first time period, the first compensation value may be determined based on a downlink channel received by the terminal device before the first time period. To be specific, the terminal device may perform initial frequency estimation based on the downlink channel in the first slot to determine the first compensation value. Further, pre-compensation may be performed for all time domain units in the first frequency compensation segment based on the first compensation value. As mentioned above, when transmission starts, it is assumed that uplink transmission and downlink transmission have the same path loss and Doppler shift, the terminal device may determine the first compensation value based on an estimated channel response of a downlink. Based on the first compensation value, the terminal device may perform frequency offset pre-compensation for all time domain units in the first frequency compensation segment. In this case, the first slot at the beginning of the first frequency compensation segment and subsequent slots, or symbols in the slots, contain an initial frequency offset compensation value.

In some embodiments, the terminal device may determine a compensation value of each subsequent frequency compensation segment based on the compensation value of the first frequency compensation segment. To be specific, when the first frequency compensation segment is a frequency compensation segment other than the first-indexed frequency compensation segment, the first compensation value may be determined based on a second compensation value corresponding to a second frequency compensation segment before the first frequency compensation segment. In this case, pre-compensation is performed for all time domain units in the first frequency compensation segment based on the first compensation value. The second frequency compensation segment before the first frequency compensation segment indicates that in time domain, the second frequency compensation segment is generated before the first frequency compensation segment. The terminal device first performs pre-compensation for the second frequency compensation segment, and then performs pre-compensation for the first frequency compensation segment. The second frequency compensation segment may be a first-indexed frequency compensation segment within the first time period, or may be any frequency compensation segment other than the last frequency compensation segment in the first time period.

As a possible implementation, when performing frequency offset compensation for the first frequency compensation segment, the terminal device may perform pre-compensation based on a result of estimation of a previous frequency compensation segment. Specifically, the terminal device may estimate the first compensation value for the first frequency compensation segment based on a frequency offset estimated for the previous frequency compensation segment. For example, in three frequency compensation segments in FIG. 7, a corresponding compensation value may be determined for the second frequency compensation segment based on a compensation result of the first frequency compensation segment, and a corresponding compensation value may be determined for the third frequency compensation segment based on a compensation result of the second frequency compensation segment.

As another possible implementation, after the terminal device performs pre-compensation for the first frequency compensation segment, a corresponding compensation value may be determined for each subsequent frequency compensation segment based on a compensation result of the first frequency compensation segment.

For example, after performing frequency offset estimation based on channel estimation or a plurality of DMRS symbols in the first slot, the terminal device may perform pre-compensation for the first frequency compensation segment. A phase continuity adjustment factor may be added to a frequency offset estimation result of a previous segment for each subsequent frequency compensation segment, to perform frequency compensation in the subsequent frequency compensation segment. In other words, for a subsequent first frequency compensation segment, a first compensation value may be determined based on a compensation result of a previous segment and an adjustment factor. As a possible implementation, the adjustment factor may be related to the first frequency compensation segment and a location of the first frequency compensation segment within the first time period. For example, when the first time period includes M first frequency compensation segments, and an adjustment factor for an $i^{th}$ first frequency compensation segment in the M first frequency compensation segments may be $e^{-j2\pi\overline{\Delta f_i} \cdot \varnothing}$, where $\varnothing$ represents an adjustment parameter for maintaining phase continuity of the $i^{th}$ first frequency compensation segment, and $\Delta f_i$ represents a frequency offset within the $i^{th}$ first frequency compensation segment. A further description is made below with reference to a calculation manner for frequency offset estimation.

In some embodiments, the terminal device may perform frequency offset estimation based on the first time domain unit within each frequency compensation segment to obtain a corresponding compensation value. When the time domain unit is a slot, the first slot in each frequency compensation segment may function as a frequency offset estimation slot to compensate for a subsequent frequency offset of the segment. As mentioned above, in a DMRS bundling window, a time during which power consistency and phase continuity are broken becomes an interval between a plurality of frequency compensation segments. Due to phase discontinuity, different frequency compensation segments may correspond to different compensation values.

As a possible implementation, the first frequency compensation segment may be any frequency compensation segment within the first time period. The terminal device may perform frequency offset estimation between frequency compensation segments or by using continuous DMRS symbols in the first slot at the beginning of each frequency compensation segment. In other words, the first compensation value may be determined based on one or more DMRS symbols in the first slot within the first frequency compensation segment. Based on the first compensation value, the terminal device may perform pre-compensation for other subsequent slots within the first frequency compensation segment.

For example, the first time period is one DMRS bundling window. When performing frequency offset estimation based on a DMRS symbol, the terminal device may determine the frequency offset within the first frequency compensation segment based on the following manner.

It is assumed that the DMRS bundle involves N slots, each frequency compensation segment involves M (i) slots, and frequency offset estimation is performed on several symbols occupied by DMRSs in a slot M (i, 1) of each frequency compensation segment. M (i, 1) represents the first slot in the $i^{th}$ frequency compensation segment.

The terminal device sends an uplink after performing an N-point inverse fast Fourier transform (inverse fast Fourier transform, IFFT). In the first time period for the uplink, a plurality of consecutive DMRS pilot signals s(k) in M(i,1) are:

$$s(k) = \frac{1}{\sqrt{N}} \sum_{n=0}^{N-1} X_n \exp\left(j\frac{2\pi kn}{N}\right),$$

$$k = 0, 1...N-1$$

In which, $X_n$ represents a DMRS pilot signal, N represents a number of DMRS pilot symbol sampling points, n represents sequence numbers of N sampling points in time domain, k represents sequence numbers of N sampling points in frequency domain, exp( ) represents an exponential function with e as a base, and j represents an imaginary unit. Defined parameters are not described in detail below. A time domain impulse response h(τ, t) of a multipath channel may be expressed as:

$$h(\tau, t) = \sum_{i=0}^{ip-1} h_i(t)\delta(\tau - \tau_i)$$

In which, ip represents a number of paths, $h_i(t)$ represents an impulse response of an $i^{th}$ path, $\tau_i$ represents a delay of the $i^{th}$ path, and $\delta(\tau-\tau_i)$ is an impulse function.

In the DMRS bundling window, an event may cause phase discontinuity, and the terminal device may need to perform separate frequency offset estimation and compensation for all frequency compensation segments. The terminal device may perform frequency offset estimation on a plurality of DMRS symbols in the first slot within the frequency compensation segment, and use an estimated frequency offset for frequency offset compensation in subsequent slots.

Specifically, Δf is defined as a frequency offset. Based on a plurality of pilot signals in the first slot, a 2N point sequence is obtained based on the following equation:

$$r(k) = s(k)\exp\left(j\frac{2\pi k\Delta f}{N}\right) + n(k),$$

$$k = 0, 1...2N-1$$

In which, r(k) represents a sequence with a length of 2N, k represents a sequence number, and n(k) represents noise.

An $n^{th}$ element $R_{1n}$ of the first half of the N-point discrete Fourier transform (discrete Fourier transform, DFT) is:

$$R_{1n} = \sum_{k=0}^{N-1} r(k)\exp\left(j\frac{-2\pi kn}{N}\right)$$

$$n = 0, 1, ....N-1$$

An $n^{th}$ element $R_{2n}$ of the second half of the N-point DFT is:

$$R_{2n} = R_{1n}\exp(j2\pi\Delta f)$$

Finally, a frequency offset is estimated by performing averaging on several symbols:

$$\Delta f = \left(\frac{1}{2\pi N}\right)\tan^{-1}\frac{\sum_{n=-N}^{N} Im[R_{2n}R_{1n}^*]}{\sum_{n=-N}^{N} Re[R_{2n}R_{1n}^*]}$$

In which, $Im[R_{2n}R^*_{1n}]$ represents an imaginary part of a product of elements $R_{2n}$ and $R^*_{1n}$, and $Re[R_{2n}R^*_{1n}]$ represents a real part of the product of the elements $R_{2n}$ and $R^*_{1n}$.

After the frequency offset is estimated for each frequency compensation segment, pre-compensation may be performed on other slots or symbols in the segment, so that phase continuity and power continuity can be maintained. A compensation value corresponding to each frequency compensation segment may be determined based on the frequency offset. For example, subsequent slots of the $i^{th}$ frequency compensation segment may be pre-multiplied by a pre-compensation number:

$$e^{-j2\pi\Delta fi}$$

In which, Δfi represents a frequency offset of the $i^{th}$ frequency compensation segment.

TA adjustment or other events that occur during the plurality of frequency compensation segments may cause phase discontinuity. If a compensation value for the first frequency compensation segment is determined based on a compensation result for a previous frequency compensation segment, an adjustment parameter may be added to the above pre-compensation number. The adjustment parameter is the adjustment factor mentioned above. For example, subsequent slots of an $i^{th}$ UL segment are pre-multiplied by the pre-compensation number:

$$e^{-j2\pi\Delta fi + \emptyset}$$

In which, Ø represents the adjustment factor for maintaining phase continuity of the $i^{th}$ frequency compensation segment. The adjustment factor may be configured by the network device, or may be determined by the terminal device based on an actual situation.

In some embodiments, the frequency offset estimation and compensation process for all frequency compensation segments may be the same. For example, the frequency offset estimation in the first time period all uses the compensation value for the first frequency compensation segment. For another example, each frequency compensation segment uses the frequency offset compensation manner in the first slot for subsequent slots.

Figure 8:
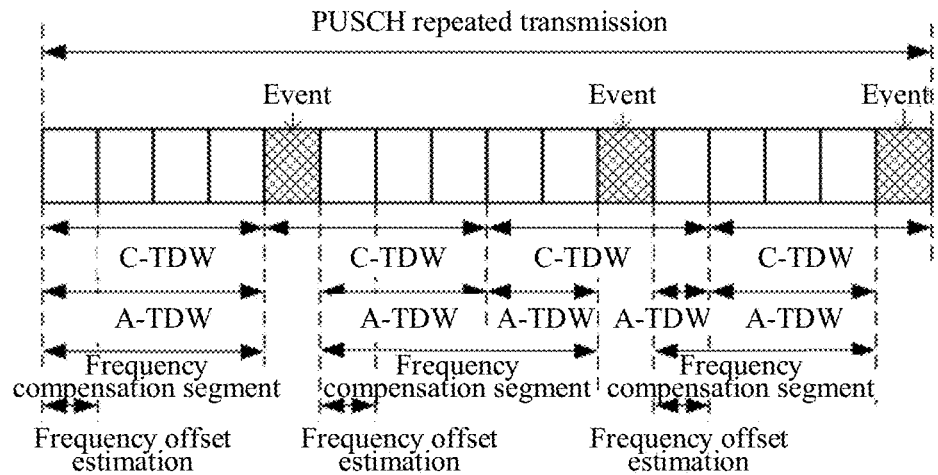
FIG. 8 is a schematic diagram of another possible implementation of a method according to an embodiment of the present application.
Figure 9:
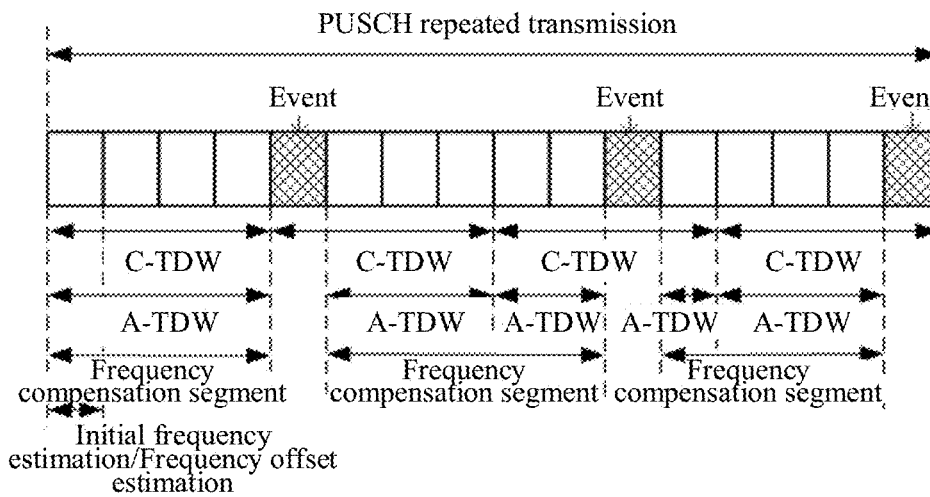
FIG. 9 is a schematic diagram of still another possible implementation of a method according to an embodiment of the present application.

The foregoing describes pre-compensation for a plurality of frequency compensation segments with reference to a plurality of manners of determining the first compensation value. For ease of understanding, several possible compensation manners are specifically described below with reference to FIG. 7 to FIG. 9. In FIG. 7 to FIG. 9, the first time period in which the terminal device performs a PUSCH repeated transmission by using 16 slots includes three frequency compensation segments. Compensation manners for the three frequency compensation segments in each of FIG.

7 and FIG. 9 are different, and compensation manners for the three frequency compensation segments in FIG. 8 are consistent.

Reference is made to FIG. 7. In the first frequency compensation segment, the terminal device performs initial frequency estimation based on a downlink channel. Frequency offset pre-compensation is performed for a slot of the first frequency compensation segment based on the initial frequency estimation. In the second and third frequency compensation segments, the terminal device uses the first slot as a frequency offset estimation slot to obtain a compensation value. The terminal device performs compensation for slots other than the first slot in the frequency compensation segment based on the compensation value. In other words, pre-compensation cannot be performed for the frequency offset estimation slot.

Reference is made to FIG. 8. The first slot of each of the three frequency compensation segments is a frequency offset estimation slot. The terminal device obtains a compensation value for a corresponding frequency compensation segment based on the frequency offset estimation slot, and performs compensation for slots other than the first slot in the frequency compensation segment.

Reference is made to FIG. 9. In the first frequency compensation segment, the terminal device may perform initial frequency estimation based on a downlink channel, or may use the first slot as a frequency offset estimation slot to estimate a frequency offset.

After the terminal device performs initial frequency estimation based on the downlink channel, pre-compensation may be performed for all slots of the first frequency compensation segment based on the determined first compensation value. An adjustment factor may be added to the first compensation value for the second and third frequency compensation segments, to determine corresponding compensation values. Pre-compensation may be performed for all slots of the second and third frequency compensation segments based on the determined compensation values. Therefore, pre-compensation is performed for all slots in the first time period.

When the terminal device uses the first slot of the first frequency compensation segment as a frequency offset estimation slot, pre-compensation is performed for other slots of the first frequency compensation segment based on the determined first compensation values. Pre-compensation may also be performed for all slots of the second and third frequency compensation segments based on the first compensation values and the adjustment factor. Therefore, pre-compensation is performed for slots other than the first slot in the first time period.

The foregoing describes the method embodiments of the present application in detail with reference to FIG. 5 to FIG. 9. The apparatus embodiments of the present application are described in detail below with reference to FIG. 10 to FIG. 12. It should be understood that the description of the apparatus embodiments corresponds to the description of the method embodiments, and therefore, for parts that are not described in detail, reference may be made to the foregoing method embodiments.

Figure 10:
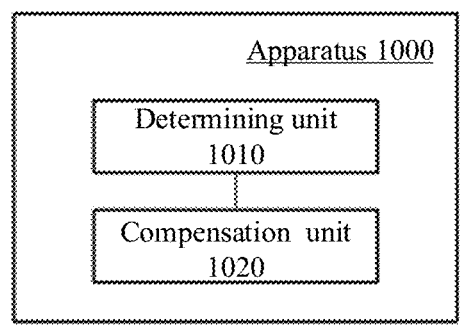
FIG. 10 is a schematic diagram of a structure of an apparatus for wireless communication according to an embodiment of the present application.

FIG. 10 is a schematic diagram of a structure of an apparatus for wireless communication according to an embodiment of the present application. The apparatus 1000 may be any terminal device described above. The apparatus 1000 shown in FIG. 10 includes a determining unit 1010 and a compensation unit 1020.

The determining unit 1010 may be configured to determine a plurality of frequency compensation segments within a first time period based on first information, where the first information is related to a DMRS bundle used for joint channel estimation, and the first time period includes at least one time domain window corresponding to the DMRS bundle.

The compensation unit 1020 may be configured to perform pre-compensation on an uplink channel corresponding to the first time period based on the plurality of frequency compensation segments.

Optionally, the first information is used to determine one or more of the following information: a time domain location within the first time period; an event that breaks phase continuity within the first time period; an A-TDW within the first time period; or a C-TDW within the first time period.

Optionally, the event that breaks the phase continuity within the first time period includes updating of a TA, and the TA includes a common TA and/or a TA corresponding to the terminal device.

Optionally, the plurality of frequency compensation segments are determined based on the A-TDW and/or C-TDW within the first time period, and a size of the A-TDW and a size of the C-TDW are dynamically adjusted based on a moving speed and/or antenna switching of a satellite in an NTN system.

Optionally, the time domain window corresponding to the DMRS bundle is determined based on a relative location between a satellite in an NTN system and the terminal device.

Optionally, the relative location between the satellite and the terminal device includes an elevation angle of the terminal device relative to the satellite, and a duration T of the time domain window corresponding to the DMRS bundle meets the following condition: $T=K\times\theta$, where $\theta$ represents the elevation angle, K represents a scale factor, and $K>0$.

Optionally, the first time period includes a plurality of DMRS bundles, and each of the plurality of frequency compensation segments corresponds to one or more of the DMRS bundles.

Optionally, the first information is further used to indicate boundaries of the plurality of frequency compensation segments, and the determining unit 1010 is further configured to determine, based on the boundaries of the plurality of frequency compensation segments, whether to update a TA.

Optionally, the plurality of frequency compensation segments include a first frequency compensation segment, and the determining unit 1010 is further configured to determine a first compensation value corresponding to the first frequency compensation segment, where the first compensation value is related to a frequency offset within the first frequency compensation segment.

Optionally, the first compensation value is determined based on one or more of the following information: a time domain location of the first frequency compensation segment within the first time period; a downlink channel received by the terminal device before the first time period; one or more DMRS symbols of the first time domain unit within the first frequency compensation segment; a second compensation value corresponding to a second frequency compensation segment before the first frequency compensation segment; or an adjustment factor related to phase continuity of the first frequency compensation segment.

Optionally, the first frequency compensation segment is a first-indexed frequency compensation segment within the first time period, the first compensation value is determined based on the downlink channel received by the terminal device before the first time period, and in all time domain units in the first frequency compensation segment, the pre-compensation is performed based on the first compensation value.

Optionally, the first frequency compensation segment is a frequency compensation segment other than the first-indexed frequency compensation segment within the first time period, the first compensation value is determined based on the second compensation value corresponding to the second frequency compensation segment before the first frequency compensation segment, and in all time domain units in the first frequency compensation segment, the pre-compensation is performed based on the first compensation value.

Optionally, the first compensation value is determined based on the one or more DMRS symbols of the first time domain unit within the first frequency compensation segment, and in time domain units other than the first time domain unit in the first frequency compensation segment, the pre-compensation is performed based on the first compensation value.

Optionally, the first compensation value is determined based on the adjustment factor related to the phase continuity of the first frequency compensation segment, and the adjustment factor is related to the first frequency compensation segment and a location of the first frequency compensation segment within the first time period.

Optionally, the first time period includes M first frequency compensation segments, and a compensation value for an $i^{th}$ first frequency compensation segment in the M first frequency compensation segments is $e^{-j2\pi\widetilde{\Delta f_i} \cdot \emptyset}$, where $\emptyset$ represents an adjustment factor for maintaining phase continuity of the $i^{th}$ first frequency compensation segment, and $\Delta f_i$ represents a frequency offset within the $i^{th}$ first frequency compensation segment.

Optionally, the frequency offset is related to a phase shift corresponding to the first frequency compensation segment, and the phase shift is determined based on one or more of the following: a Doppler shift caused by relative movement between the terminal device and a network device; or a time drift related to the terminal device and the network device.

Optionally, the first information is sent in one or more of the following forms: DCI, RRC signalling, or SIB information.

Optionally, the apparatus 1000 further includes a sending unit that may be configured to send second information to a network device, where the second information is used to indicate whether the terminal device is capable of supporting the pre-compensation.

Figure 11:
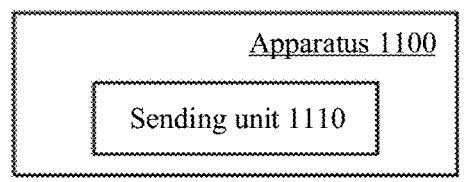
FIG. 11 is a schematic diagram of a structure of another apparatus for wireless communication according to an embodiment of the present application.

FIG. 11 is a schematic diagram of a structure of an apparatus for wireless communication according to another embodiment of the present application. The apparatus 1100 may be any network device described above. The apparatus 1100 shown in FIG. 11 includes a sending unit 1110.

The sending unit 1110 may be configured to send first information to a terminal device, where the first information is used by the terminal device to determine a plurality of frequency compensation segments within a first time period, the first information is related to a DMRS bundle used for joint channel estimation, and the first time period includes at least one time domain window corresponding to the DMRS bundle, where the plurality of frequency compensation segments are used by the terminal device to perform pre-compensation on an uplink channel corresponding to the first time period.

Optionally, the first information is used to determine one or more of the following information: a time domain location within the first time period; an event that breaks phase continuity within the first time period; an A-TDW within the first time period; or a C-TDW within the first time period.

Optionally, the event that breaks the phase continuity within the first time period includes updating of a TA, and the TA includes a common TA and/or a TA corresponding to the terminal device.

Optionally, the plurality of frequency compensation segments are determined based on the A-TDW and/or C-TDW within the first time period, and a size of the A-TDW and a size of the C-TDW are dynamically adjusted based on a moving speed and/or antenna switching of a satellite in an NTN system.

Optionally, the time domain window corresponding to the DMRS bundle is determined based on a relative location between a satellite in an NTN system and the terminal device.

Optionally, the relative location between the satellite and the terminal device includes an elevation angle of the terminal device relative to the satellite, and a duration T of the time domain window corresponding to the DMRS bundle meets the following condition: $T=K \times \theta$, where $\theta$ represents the elevation angle, K represents a scale factor, and $K>0$.

Optionally, the first time period includes a plurality of DMRS bundles, and each of the plurality of frequency compensation segments corresponds to one or more of the DMRS bundles.

Optionally, the first information is further used to indicate boundaries of the plurality of frequency compensation segments. The apparatus 1100 further includes a determining unit. The determining unit may be configured to determine, based on the boundaries of the plurality of frequency compensation segments, whether to limit updating of a TA.

Optionally, the first information is sent in one or more of the following forms: DCI, RRC signalling, or SIB information.

Optionally, the apparatus 1100 further includes a receiving unit. The receiving unit may be configured to receive second information sent by the terminal device, where the second information is used to indicate whether the terminal device is capable of supporting the pre-compensation.

Figure 12:
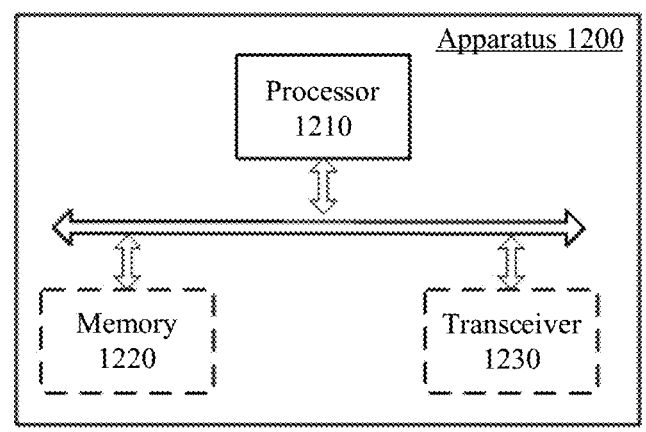
FIG. 12 is a schematic diagram of a structure of a communications apparatus according to an embodiment of the present application.

FIG. 12 is a schematic diagram of a structure of a communications apparatus according to an embodiment of the present application. The dashed lines in FIG. 12 indicate that the unit or module is optional. The apparatus 1200 may be configured to implement the methods described in the foregoing method embodiments. The apparatus 1200 may be a chip, a terminal device, or a network device.

The apparatus 1200 may include one or more processors 1210. The processor 1210 may allow the apparatus 1200 to implement the methods described in the foregoing method embodiments. The processor 1210 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program that may be executed by the processor 1210, so that the processor

1210 performs the method described in the foregoing method embodiments. The memory 1220 may be independent of the processor 1210 or may be integrated into the processor 1210.

The apparatus 1200 may further include a transceiver 1230. The processor 1210 may communicate with another device or chip by using the transceiver 1230. For example, the processor 1210 may send data to and receive data from another device or chip by using the transceiver 1230.

An embodiment of the present application further provides a computer-readable storage medium for storing a program. The computer-readable storage medium may be applied to the terminal device or the network device provided in embodiments of the present application, and the program causes a computer to perform the methods to be performed by the terminal or the network device in various embodiments of the present application.

The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state drive (solid state drive, SSD)), or the like.

An embodiment of the present application further provides a computer program product. The computer program product includes a program. The computer program product may be applied to the terminal device or the network device provided in embodiments of the present application, and the program causes a computer to perform the methods to be performed by the terminal or the network device in various embodiments of the present application.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (digital subscriber line, DSL)) manner or a wireless (such as infrared, wireless, and microwave) manner.

An embodiment of the present application further provides a computer program. The computer program may be applied to the terminal device or the network device provided in embodiments of the present application, and the computer program causes a computer to perform the methods to be performed by the terminal device or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, the term "corresponding" may mean that there is a direct or indirect correspondence between the two, or may mean that there is an association relationship between the two, which may also be a relationship such as indicating and being indicated, or configuring and being configured.

In embodiments of the present application, "pre-defined" or "pre-configured" may be implemented by pre-storing corresponding codes, tables, or other forms that can be used to indicate related information in devices (for example, including the terminal device and the network device), and a specific implementation thereof is not limited in the present application. For example, pre-defined may refer to defined in the protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, determining B based on A does not mean determining B based only on A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objective of the solutions of embodiments.

In addition, functional units in embodiments of the present application may be integrated into one processing unit, or each of the units may exist alone physically, or two or more units may be integrated into one unit.

The foregoing descriptions are merely specific implementations of the present application, but the protection scope of present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
    determining, by a terminal device operating in a non-terrestrial network (NTN) system, a plurality of frequency compensation segments within a first time period based on first information, wherein the first information comprises information of demodulation reference signal (DMRS) bundle used for joint channel estimation, and the first time period comprises at least one time domain window corresponding to the DMRS bundle, wherein the first information indicates boundaries of the plurality of frequency compensation segments;
    determining, by the terminal device based on the boundaries of the plurality of frequency compensation segments, whether to update a timing advance (TA); and
    performing, by the terminal device, pre-compensation on an uplink channel corresponding to the first time period based on the plurality of frequency compensation segments.

2. The method according to claim 1, wherein the first information is used to determine one or more of the following information:
    a time domain location within the first time period;
    an event that breaks phase continuity within the first time period;
    an actual time domain window (A-TDW) within the first time period; or
    a configured time domain window (C-TDW) within the first time period.

3. The method according to claim 2, wherein the event that breaks the phase continuity within the first time period comprises updating of the TA, and the TA comprises at least one of a common TA or a TA corresponding to the terminal device.

4. The method according to claim 2, wherein the plurality of frequency compensation segments are determined based on at least one of the A-TDW or the C-TDW within the first time period, and a size of the A-TDW and a size of the C-TDW are dynamically adjusted based on at least one of a moving speed or antenna switching of a satellite in a non-terrestrial network (NTN) system.

5. The method according to claim 1, wherein the time domain window corresponding to the DMRS bundle is determined based on a relative location between a satellite in an NTN system and the terminal device.

6. The method according to claim 5, wherein the relative location between the satellite and the terminal device comprises an elevation angle of the terminal device relative to the satellite, and a duration T of the time domain window corresponding to the DMRS bundle meets the following condition:

$$T=K \times \theta,$$

wherein
    θ represents the elevation angle, K represents a scale factor, and K>0.

7. The method according to claim 1, wherein the first time period comprises a plurality of DMRS bundles, and each of the plurality of frequency compensation segments corresponds to one or more of the DMRS bundles.

8. The method according to claim 1, wherein the plurality of frequency compensation segments comprise a first frequency compensation segment, and before the performing, by the terminal device, pre-compensation on an uplink channel corresponding to the first time period based on the plurality of frequency compensation segments, the method further comprises:
    determining, by the terminal device, a first compensation value corresponding to the first frequency compensation segment, wherein the first compensation value is related to a frequency offset within the first frequency compensation segment.

9. The method according to claim 8, wherein the first compensation value is determined based on one or more of the following information:
    a time domain location of the first frequency compensation segment within the first time period;
    a downlink channel received by the terminal device before the first time period;
    one or more DMRS symbols of a first time domain unit within the first frequency compensation segment;
    a second compensation value corresponding to a second frequency compensation segment before the first frequency compensation segment; or
    an adjustment factor related to phase continuity of the first frequency compensation segment.

10. The method according to claim 9, wherein the first frequency compensation segment is a first-indexed frequency compensation segment within the first time period, the first compensation value is determined based on the downlink channel received by the terminal device before the first time period, and in time domain units in the first frequency compensation segment, the pre-compensation is performed based on the first compensation value.

11. The method according to claim 9, wherein the first frequency compensation segment is a frequency compensation segment other than a first-indexed frequency compensation segment within the first time period, the first compensation value is determined based on the second compensation value corresponding to the second frequency compensation segment before the first frequency compensation segment, and in time domain units in the first frequency compensation segment, the pre-compensation is performed based on the first compensation value.

12. The method according to claim 9, wherein the first compensation value is determined based on the one or more DMRS symbols of the first time domain unit within the first frequency compensation segment, and in time domain units other than the first time domain unit in the first frequency compensation segment, the pre-compensation is performed based on the first compensation value.

13. The method according to claim 9, wherein the first compensation value is determined based on the adjustment factor related to the phase continuity of the first frequency compensation segment, and the adjustment factor is related to the first frequency compensation segment and a location of the first frequency compensation segment within the first time period.

14. The method according to claim 13, wherein the first time period comprises first frequency compensation segments, and a compensation value for an $i^{th}$ first frequency compensation segment in the M first frequency compensation segments $e-j2\pi\Delta fi+\phi$ is et, wherein represents an adjustment factor for maintaining phase continuity of the $i^{th}$ first frequency compensation segment, $\Delta fi$ represents a frequency offset within the $i^{th}$ first frequency compensation segment, and j represents an imaginary unit.

15. The method according to claim 8, wherein the frequency offset is related to a phase shift corresponding to the first frequency compensation segment, and the phase shift is determined based on one or more of the following:
   a Doppler shift caused by relative movement between the terminal device and a network device; or
   a time drift related to the terminal device and the network device.

16. The method according to claim 1, wherein the first information is received in one or more of the following forms: downlink control information (DCI), radio resource control (RRC) signalling, or system information block (SIB) information.

17. The method according to claim 1, wherein the method further comprises:
   sending, by the terminal device, second information to a network device, wherein the second information indicates whether the terminal device is capable of supporting the pre-compensation.

18. A method for wireless communication, comprising:
   sending, by a network device operating in a non-terrestrial network (NTN) system, first information to a terminal device, wherein the first information comprises information of a demodulation reference signal (DMRS) bundle used for joint channel estimation, wherein
   the first information is used to determine a plurality of frequency compensation segments within a first time period, the plurality of frequency compensation segments are used to perform pre-compensation on an uplink channel corresponding to the first time period, and the first time period comprises at least one time domain window corresponding to the DMRS bundle, and wherein the first information indicates boundaries of the plurality of frequency compensation segments that are used to determine whether to update a timing advance (TA).

19. A terminal device, comprising:
   at least one processor; and
   one or more memories coupled to the at least one processor and storing programming instructions for execution by the at least one processor to cause the terminal device to perform operations comprising:
   determining, a plurality of frequency compensation segments within a first time period based on first information when operating in a non-terrestrial network (NTN) system, wherein the first information comprises information of demodulation reference signal (DMRS) bundle used for joint channel estimation, and the first time period comprises at least one time domain window corresponding to the DMRS bundle, wherein the first information indicates boundaries of the plurality of frequency compensation segments;
   determining, by the terminal device based on the boundaries of the plurality of frequency compensation segments, whether to update a timing advance (TA); and
   performing pre-compensation on an uplink channel corresponding to the first time period based on the plurality of frequency compensation segments.

20. The terminal device according to claim 19, wherein the time domain window corresponding to the DMRS bundle is determined based on a relative location between a satellite in an NTN system and the terminal device.

* * * * *